United States Patent [19]

Sumida et al.

[11] Patent Number: 4,652,618
[45] Date of Patent: Mar. 24, 1987

[54] POLYORGANOSILOXANE COMPOSITIONS FOR SURFACE TREATMENT

[75] Inventors: Heiji Sumida; Hiroshi Kimura, both of Ohta, Japan

[73] Assignee: Toshiba Silicone Co., Ltd., Japan

[21] Appl. No.: 806,080

[22] Filed: Dec. 6, 1985

[30] Foreign Application Priority Data

Dec. 29, 1984 [JP] Japan .................. 59-280859

[51] Int. Cl.⁴ .......................................... C08F 283/00
[52] U.S. Cl. ................... 525/478; 525/476; 525/477; 528/15; 528/18; 528/19; 528/21; 528/31
[58] Field of Search ............ 525/476, 477, 478; 528/15, 31, 21, 18, 19

[56] References Cited

U.S. PATENT DOCUMENTS 4,351,736  9/1982  Steinberger et al. ............... 528/18
4,474,930  10/1984  Mikami et al. ...................... 525/476

Primary Examiner—Melvyn I. Marquis

[57] ABSTRACT

Polyorganosiloxane compositions for surface treatment comprising:
(A) a polydiorganosiloxane having a viscosity of 50 cSt to 10,000,000 cSt at 25° C., the terminal units of which are blocked by hydroxy groups;
(B) a curing agent which comprises a mixture or a partially reacted mixture of:
(1) a polyorganosiloxane composed of structural units represented by the formula:

$(R^1)_a SiO_{(4-a)/2}$ wherein, $R^1$s are the same or different and each represents a hydrogen atom or a substituted or unsubstituted monovalent hydrocarbyl group and at least two $R^1$s out of the total $R^1$s in a molecule are monovalent hydrocarbyl groups substituted by an epoxy-containing group; and a represents an integer of 1 to 3, and having a polymerization degree of 10 to 5,000;
(2) a silane and/or a siloxane having a substituted or unsubstituted amino group bonded to a silicon atom via at least one carbon atom and also having at least one alkoxy group bonded to a silicon atom;
at a proportion of 0.1 to 10 amino groups contained in (2) per epoxy-containing group contained in (1); and
(C) a polymethylsilsesquioxane having a mean particle diameter of 0.1 to 100 μm.

10 Claims, No Drawings

POLYORGANOSILOXANE COMPOSITIONS FOR SURFACE TREATMENT

The present application claims priority of Japanese patent application Ser. No. 84/280859 filed Dec. 29, 1984.

BACKGROUND OF THE INVENTION

The present invention relates to polyorganosiloxane compositions that may be used to treat the surface of substrates such as papers, rubbers, plastics and metals to impart non-sticking, water-repelling, abrasion-resistant, sliding and luster-preventing properties. The present invention further relates to polyorganosiloxane compositions that may be used to form a primer film which improves the adhesive ability of other polysiloxane compositions when they are applied onto a substrate.

Heretofore, various types of polyorganosiloxane compositions have been employed in the treatment of the surface of substrates in order to impart to it a non-sticking property.

The prior art compositions may be classified as follows:

(1) Solutions prepared by adding a polyorganosiloxane containing Si—H bonds and/or an organoalkoxysilane to a polydiorganosiloxane terminated by hydroxy groups, and further admixing an organic tin compound and an organic solvent;

(2) Aqueous emulsions prepared by adding a polyorganosiloxane containing Si—H bonds and/or an organoalkoxysilane to a polydiorganosiloxane terminated by hydroxy groups, further admixing a polyvinylalcohol, followed by emulsification with water;

(3) Compositions comprising a polyorganosiloxane containing two or more vinyl groups in the molecule, a polyorganosiloxane containing Si—H bond, a platinum or a platinum compound, an organic solvent and/or a curing-inhibitor.

These polyorganosiloxane compositions have an excellent property of affording non-sticking film onto the surface of substrates. However, they involve a disadvantage in that a cured silicone layer tends to slip off a rubber or plastic substrate. Further, in the case of compositions (3) mentioned above where they are used for the surface-treatment of such substrates as natural rubbers, ordinary synthetic rubbers or soft polyvinyl chlorides, the platinum or the platinum compound contained in the compositions (3) tends to be deactivated by the vulcanizing agent, vulcanization-accelerater or plasticizer contained in the substrates, whereby curing of the compositions (3) tends to be prevented.

The present inventors earnestly studied the disadvantages mentioned above and attempted to impart to the surface of substrates, in particular rubbers and plastics, excellent non-sticking, water-repelling and abrasion-resistant properties. As a result, it was found that the sliding property could be imparted to cured films by use of a composition comprising (a) a polyorganosiloxane having at least two monovalent hydrocarbyl groups substituted by an epoxy-containing group (such as a glycidoxy group and/or an epoxycyclohexyl group) bonded to a silicon atom in the molecule, and (b) a silane and/or siloxane having a substituted or unsubstituted amino group bonded to a silicon atom via at least one carbon atom and having one or more alkoxy groups bonded to a silicon atom, and (c) a polydiorganosiloxane having terminated by hydroxyl groups, whereby the polydiorganosiloxane participates in the formation of the network structure by means of an alcohol-eliminating condensation reaction between the alkoxy groups of the silane and/or siloxane having such alkoxy groups, and the polydiorganosiloxane. It was also found that, by adding a polyorganohydrogensiloxane and a metal salt of a fatty acid to the compositions mentioned above, and by allowing a hydrogen-eliminating condensation reaction to take place simultaneously between the polyorganosiloxane terminated by a hydroxy group and the polyorganohydrogensiloxane, the curing rate upon heat-curing could be promoted (Japanese Provisional Patent Publication No. 79-45361).

However, the sliding property of the rubber surface against glass or coated steel plate was not sufficient. Further, since luster appeared by treatment of the surface, this method was unsuitable where luster should be avoided.

In order to cope with this, there may be further admixed a powder such as aerosol silica. However, addition of a small amount thereof is not sufficient to diminish luster, whereas addition of an increased amount thereof has made it difficult to attain a uniform mixture. Similarly, there may be included a fluorocarbon resin powder. However, also in this case, a sufficient amount to diminish luster could not be obtained. Moreover, a large quantity of a fluorocarbon resin powder is required in order to attain the desired sliding property. Further, there is a problem in that this method brings about a white powdery appearance of the surface thus treated, which is not a desired result.

SUMMARY OF THE INVENTION

As a result of further intensive investigations for solving the problems mentioned above, the present inventors have now found that compositions for surface treatment having excellent properties and overcoming such problems may be obtained by use of a polymethylsilsesquioxane as an additive.

Thus, the present invention has been made based on these findings and an object of the present invention is to provide homogeneous polyorganosiloxane compositions for surface treatment which diminish the surface luster and have an excellent sliding property.

DESCRIPTION OF THE INVENTION

The polyorganosiloxane compositions for surface treatment according to the present invention comprise:
(A) a polydiorganosiloxane having a viscosity of 50 cSt to 10,000,000 cSt at 25° C., the terminal units of which are blocked by hydroxy groups;
(B) a curing agent which comprises a mixture of:
  (1) a polyorganosiloxane composed of structural units represented by the formula:

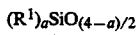

wherein, R$^1$s are the same or different and each represents a hydrogen atom or a substituted or unsubstituted monovalent hydrocarbyl group and at least two R$^1$s out of the total R$^1$s in a molecule are monovalent hydrocarbyl groups substituted by an epoxy-containing group; and a represents an integer of 1 to 3, and having a polymerization degree of 10 to 5,000; and
  (2) a silane and/or a siloxane having a substituted or unsubstituted amino group bonded to a silicon atom via at least one carbon atom and also having at least one alkoxy group bonded to a silicon atom; at a proportion of 0.1 to 10 amino groups contained in (2) per epoxy-containing group contained in (1); a partially reacted product thereof; or a mixture of the partially reacted product thereof with (1) and/or (2); and (C) a polymethylsilsesquioxane having a mean particle diameter of 0.1 to 100 μm, and may further optionally comprise the following components (D) and (E):

(D) a polyorganohydrogensiloxane containing at least three hydrogen atoms bonded to silicon atoms in a molecule; and (E) a curing catalyst.

The polydiorganosiloxane which is Component (A) in the present invention, has a hydroxy group bonded to each terminal silicon atom and thus participates in the curing reaction due to their reactivity.

The organic groups bonded to the silicon atoms in the molecule includes, for example, an alkyl group such as methyl, ethyl, propyl, butyl or hexyl; an alkenyl group such as vinyl or propenyl; an aryl group such as phenyl; an aralkyl group such as β-phenylethyl; and any of the above-mentioned hydrocarbyl groups, whose hydrogen atoms are partially substituted with a halogen atom, a nitrile group, etc. Among them, the methyl group is generally employed because of ease of synthesis and of the balance between the viscosity of the compositions prior to curing and film properties after curing.

The polydiorganosiloxane whose terminal units are blocked by hydroxy groups should have a viscosity at 25° C. of 50 cSt to 10,000,000 cSt, preferably 1,000 cSt to 2,000,000 cSt. Those with a viscosity of less than 50 cSt will provide vulnerable films after curing, whereas those of higher than 10,000,000 cSt will give too viscous compositions prior to curing and thus are difficult to handle.

The polyorganosiloxane which is sub-component (B)(1) in the present invention contains at least two saturated or unsaturated monovalent hydrocarbyl groups substituted by an epoxy-containing group in the molecule. The epoxy-containing group includes, for example, glycidoxy group, 3,4-oxycyclohexyl group, etc. The group $R^1$ includes, besides the epoxylated hydrocarbyl groups mentioned above, a hydrogen atom, an alkyl group such as methyl, ethyl, propyl, butyl or hexyl; an alkenyl group such as vinyl or propenyl; an aryl group such as phenyl; an aralkyl group such as β-phenylethyl; and any of the above-mentioned hydrocarbyl groups whose hydrogen atoms are partially substituted with, for example, a halogen atom or a nitrile group. Their terminal units are usually blocked by triorganosilyl groups, although they may contain hydroxy groups bonded to silicon atoms. The polymerization degree of the polyorganosiloxane is selected in the range of from 10 to 5,000, preferably 50 to 1,000 because of ease of synthesis, ease of handling the compositions prior to curing, to provide a suitable viscosity, and mechanical properties of films after curing.

Those with a polymerization degree of less than 10 will bring about insufficient mechanical properties, whereas those of more than 5,000 will bring about difficulties in synthesis and handling because of high viscosity.

The silane and/or siloxane, which are sub-component (B)(2) in the present invention, are an alkoxysilane having a substituted or unsubstituted amino group bonded to a silicon atom via at least one carbon atom, a siloxane obtained by partial condensation of such an alkoxysilane, or a polysiloxane obtained by an equilibration reaction between the alkoxysilane and a cyclic polyorganosiloxane. The group having a substituted or unsubstituted amino group includes, for example, aminomethyl, β-aminoethyl, γ-aminopropyl, δ-aminobutyl, γ-(methylamino)propyl, γ-(ethylamino)propyl, γ-(β-aminoethylamino)propyl, and the salts thereof in which amino groups are partly or wholly quaternary-ammoniated. From the viewpoint of safety during storage, it is preferred that the amino group be bonded to a silicon atom via at least three carbon atoms as in the case of a γ-aminopropyl group. In addition to containing such a group having at least one substituted or unsubstituted amino group in a molecule, the silane and/or siloxane also contains at least one alkoxy group bonded to silicon in order to enhance the adhesive property onto the substrate.

Such an alkoxy group includes, for example, methoxy, ethoxy, propoxy and butoxy. However, methoxy and ethoxy groups are most commonly used due to their ease of synthesis. It is preferred that at least two such alkoxy groups be present in a molecule in order to obtain good adhesive property.

The proportion of the silane and/or siloxane, which are sub-component B(2), relative to the polyorganosiloxane, which is sub-component (B)(1), should be so chosen that the number of the amino groups bonded to silicon via at least one carbon atom in the former be 0.1 to 10, preferably 0.7 to 1.5 per epoxy-containing group contained in the latter. A smaller number of amino groups will bring about insufficient curing and adhesive properties, whereas a greater number of the same will bring about poor mechanical properties of films after curing.

In the present invention, sub-components (B)(1) and (B)(2) are generally used in the form of a mixture, but may also be used in the form of a reaction product thereof. Alternatively, a mixture of sub-components (B)(1) and (B)(2), or a mixture of sub-component (B)(1) or (B)(2) with a reaction product of both sub-components may be used. Here, it should be noted that the reaction product must not be wholly cured, but be in a state where the epoxy groups of sub-component (B)(1) are partially reacted with the amino groups of sub-component (B)(2).

There is no particular limitation as to the proportion of Component (A) to Component (B) to be employed in the present invention, and it may be varied freely. Where Component (A) is used at a greater amount, there may be obtained compositions having excellent non-sticking and water-repelling properties. Where Component (B) is used at a greater amount, there may be obtained compositions having an excellent abrasion-resistant property. Component (B) is generally used in an amount of 0.01 to 3 parts by weight, preferably 0.1 to 1 part by weight, based on 1 part by weight of Component (A), whereby compositions having well-balanced properties mentioned above may be obtained.

The polymethylsilsesquioxane, which is Component (C) in the present invention, is an essential component in imparting the desired properties. It affords luster-free cured films, regardless of the method of coating and the thickness of the coated layer, and imparts a good sliding property. It may also afford film-forming materials in which the precipitated powder may easily be redispersed after storage for a long period. The filler gives a smaller specific gravity of compositions after it is blended, compared with silicic fillers having a similar mean particle diameter, such as pulverized quartz and diatomaceous earth. Therefore, the specific gravity of compositions will not increase even when a large amount of the filler is incorporated. Further, such composition systems will have sufficient fluidity, with a small increase of viscosity.

The polymethylsilsesquioxane to be employed in the present invention, is preferably prepared by hydrolysing and condensing a methyltrialkoxysilane, or a hydrolysate and condensate in part thereof, in an aqueous solution of ammonia or an amine. The thus prepared product is almost free from impurities such as chlorine atoms, alkaline earth metals, and has an excellent free-flowing property with spherical forms. The particle diameter of the polymethylsilsesquioxane should be 0.1 to 100 $\mu$m, preferably 0.1 to 20 $\mu$m. There are disadvantages in that it is difficult to prepare those having a particle diameter of less than 0.1$\mu$ and to blend in an amount exceeding the required value, whereas those having the particle diameter of more than 100 $\mu$m will not give films with strength and flexibility, resulting in the failure of obtaining functions required for the present invention. There is no particular limitation as to the amount of Component (C) in final compositions. However, Component (C) is normally employed in an amount of 0.5 to 200 parts by weight, based on 100 parts by weight of the total amount of Components (A) and (B). A lower amount than 0.5 part by weight of Component (C) will bring about lack of strength and flexibility of films formed.

The object of the invention, namely imparting to the surface of substrates non-sticking, water-repelling, abrasion-resistant, sliding properties and preventing luster thereof may be attained by compositions comprising Components (A) to (C) of the present invention. However, the curing rate of films may be promoted by the addition of Components (D) and (E).

The polyorganohydrogensiloxane, which is Component (D) in the present invention, has at least three hydrogen atoms bonded to silicon atoms, which hydrogens react with the polydiorganosiloxane whose terminal groups are blocked by hydroxy groups, that is to say Component (A), and liberating hydrogens by condensation, and thus affording a network structure. The organic groups bonded to silicon atoms in the molecule include, for example, an alkyl group such as methyl, ethyl, propyl, butyl, or hexyl; an alkenyl group such as vinyl or propenyl; an aryl group such as phenyl, an aralkyl group such as $\beta$-phenylethyl; and any of the above-mentioned hydrocarbyl groups whose hydrogen atoms are partially substituted with, for example, a halogen atom or a nitrile group, the methyl group is most common due to the ease of the synthesis.

The siloxane chain in the polyorganohydrogensiloxane may be either straight, branched or cyclic.

The curing catalyst, which is Component (E) in the present invention, promotes a dehydrogenating condensation reaction between the hydroxy groups of the polyorganosiloxane whose terminal units are blocked by hydroxy groups, that is to say Component (A), and the Si—H bonds of the polyorganosiloxane, that is to say Component (D). As the curing catalyst, there may be used, for example, metal salts of fatty acids, amines, ammoniums and mixtures thereof. The metal salts of fatty acids include, for example, those having organic groups bonded directly to a metal atom, such as dibutyltin diacetate, dibutyltin dioctoate, dibutyltin dilaurate, dibutyltin dioleate, dibutyltin distearate, tributyltin acetate, tributyltin octoate, tributyltin laurate, dioctyltin diacetate, dioctyltin dilaurate, diethyltin dioleate or monomethyltin dioleate, and those having no organic group bonded directly to a metal atom, such as zinc octoate, iron octoate or stannous octoate. The amines include, for example, organic amines such as monomethylamine, dimethylamine, monoethylamine, diethylamine, ethylenediamine or hexamethyltetraamine, silane compounds having an amino group such as $\gamma$-aminopropyltriethoxysilane, and salts thereof.

The ammoniums include, for example, tetramethylammonium or dimethylbenzylammonium and salts thereof. The curing catalyst may be used in an amount of 0.5 to 10 parts by weight, based on 100 parts by total weight of Components (A) and (D). Using an amount lower than 0.5 part by weight will bring about slow curing and may cause blocking upon application of the composition onto the substrate and heat processing thereat, whereas use of a higher value than that will bring about reactions within the liquid, hence allowing only a limited period of storage.

When the compositions according to the present invention are used for the surface-treatment of various substrates, those comprising Components (A) to (C) mentioned above, or those comprising Components (A) to (E) may be used as such. Alternatively, they may be diluted with an organic solvent or emulsified in water with a suitable emulsifier.

Such organic solvents include, for example, n-hexane, n-heptane, petroleum hydrocarbons, toluene, xylene, isopropy alcohol, butyl alcohol, 1,1,1-trichloroethane or trichloroethylene.

The organic solvent may be used in a suitable amount so that the compositions to be treated will have the desired viscosity.

In the present invention, the compositions mentioned above may further contain an inorganic fine powder, such as aerosol silica, precipitated silica, silica aerosil, pulverized quartz or diatomaceous earth. The compositions may still further contain an inert silicone fluid, in particular a highly viscous polydimethylsiloxane fluid to improve the sliding property.

The compositions according to the present invention may be prepared as follows. First, Components (B)(1) and (B)(2) are blended. In doing so, both components may be either simply admixed or partly reacted. However, the mixture should be in a state that the curing is not completely carried out. Namely, it must be in a state where amino groups contained in (B)(2) are reacted with only a part of epoxy groups contained in (B)(1). The thus obtained reaction product may contain Components (B)(1) and/or (B)(2). To the compositions prepared above are added Components (A) and (C), or Components (A) and (C) to (E), to give compositions according to the present invention.

The compositions according to the present invention may be used for the surface-treatment of various substrates by the methods mentioned below. Namely, the compositions may be applied onto such substrates as papers, rubbers, plastics or metals by way of dip coating, spray coating, brush coating, knife coating or roll coating. Where a solvent or water is used, it should be removed by drying. The thus treated substrates are allowed to stand at room temperature for several hours. Alternatively, they may be heated, depending upon the substrate employed, to complete curing. The recommended heating conditions will be at 120° to 180° C. for 10 to 30 seconds for papers, at 150° to 180° C. for 1 to 5 minutes for rubbers and at 70° to 150° C. for 30 seconds to 2 minutes for plastics.

The compositions of the present invention provide cured films having a superior adhesive property to various materials and a superior surface sliding property to prior art silicone compositions, when they are used to treat surfaces of various substrates. Particularly, the compositions of the present invention provide cured films with an adhesive property even onto rubbers and plastics, which adhesive property has not been attained by the use of hitherto known non-sticking, film-forming silicone compositions. The compositions of the present invention provide cured films by treatment at room temperature or at relatively low temperature, and therefore, they may be used for the surface-treatment of substrates susceptible to temperature or those that are of large scale which are difficult to apply heat treatment. The thus prepared films will have good non-sticking, water-repelling and abrasion-resistant properties. Such cured films possess good properties for use as primers when silicone rubbers or silicone compositions capable of curing into rubbers are applied substrates.

The compositions of the present invention provide a good sliding property which have not sufficiently been attained by the reverse side treating method with the compositions mainly containing Component (B) of the present invention, as previously proposed by the present inventors.

The compositions of the present invention, therefore, may be used for forming non-sticking and water-repelling films onto various subtrates, including rubbers and plastics.

EXAMPLES OF THE INVENTION

The present invention will be further illustrated by referring to the following examples, in which "parts" means "parts by weight".

First, a polymethylsilsesquioxane was synthesized by the following method.

REFERENTIAL EXAMPLE 1

To a four-necked flask equipped with a thermometer, a reflux condenser and a stirrer, were charged 500 parts of water and 50 parts of 28% aqueous ammonia, and there was added dropwise thereto a methyltrimethoxysilane shown in Table 1 over 60 to 120 minutes with stirring. The reaction started at a temperature of 10° C., which elevated to 30° C. at the end of the addition of the methyltrimethoxysilane. The mixture was heated at 84° C., under reflux, with a mantle heater, and the stirring was continued for about 1 hour at the same temperature.

After the whole was cooled, the precipitate produced in the flask was collected, washed with water, dried and then pulverized to give a polymethylsilsesquioxane (F-1 to F-4) in the form of a powder having an excellent free-flowing property as shown in Table 1.

TABLE 1

|  | F-1 | F-2 | F-3 | F-4 |
| --- | --- | --- | --- | --- |
| Methyltrimethoxysilane, parts | 200 | 200 | 100 | 200 |
| (concentration of chlorine atom contained) | (1%) | (100 ppm) | (1 ppm) | (0.1%) |
| Aqueous ammonia, parts | 700 | 700 | 500 | 750 |
| (concentration of ammonia) | (5%) | (2.5%) | (5%) | (1%) |
| State of the product | Powder, with an excellent free-flowing property | Powder, with an excellent free-flowing property | Powder, with an excellent free-flowing property | Powder with an excellent free-flowing property |
| Concentration of chlorine atom contained | 5 ppm or less | 1 ppm or less | 0.1 ppm or less | 1 ppm or less |
| Mean particle diameter, μm | 5 | 2 | 3.5 | 1.5 |

REFERENTIAL EXAMPLE 2

To 178 parts of methyltrialkoxysilane containing 1% by weight of chlorine atom, was added 9 parts of water, and the mixture was heated at 80° C. for about 2 hours to give a partially hydrolysed and condensed product. The thus obtained product was added dropwise to 500 parts of a 3% by weight aqueous ethylenediamine, and the mixture was subjected to hydrolysis and condensation under the conditions similar to those in Referential Example 1. The thus obtained product was dried and pulverized to give a polymethylsilsesquioxane (F-5) in the form of a powder having the mean particle diameter of 8 μm.

EXAMPLE 1

A composition for treatment was prepared by blending 100 parts of polydimethylsiloxane having a hydroxy group at each terminal unit and having a viscosity of 1,000,000 cSt at 25° C., 100 parts of polydimethylsiloxane having a γ-glycidoxypropyl group at each terminal unit and having a polymerization degree of 50, 10 parts of γ-aminopropyltriethoxysilane, 40 parts of the polymethylsilsesquioxane (F-1) and 1,000 parts of trichloroethylene. The composition was applied onto a chloroprene rubber sheet, which was then heated at 180° C. for 3 minutes, followed by standing at room temperature for 24 hours to obtain a chloroprene rubber sheet having non-sticking surfaces. The thus obtained silicone layer on the surface had sufficient sliding property, with no luster, and the layer neither slipped off nor showed clouding when it was rubbed with fingers.

EXAMPLE 2

A similar experiment as in Example 1 was carried out, except that 10 parts of [(CH$_3$)$_2$N$^+$(CH$_2$)$_2$NH(CH$_2$)$_3$Si—(OCH$_3$)$_3$]Cl$^-$ were used in place of γ-aminopropyltriethoxysilane. There was obtained a solid film which adhered to the surface of chloroprene, which was non-sticking, lusterless and had a sliding property.

COMPARATIVE EXAMPLE 1

A composition was prepared by blending 100 parts of polydimethylsiloxane having a hydroxy group at terminal unit as in Example 1, 5 parts of a polymethylhydrogensiloxane represented by the average formula:

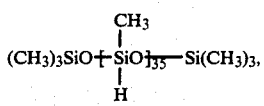

10 parts of γ-aminopropyltriethoxysilane, 2 parts of zinc octenoate and 1,000 parts of trichloroethylene. The composition was applied onto the surface of a chloroprene rubber sheet in the same manner as in Example 1. The thus prepared silicone layer slipped off when it was rubbed with fingers.

COMPARATIVE EXAMPLE 2

A chloroprene rubber sheet having a non-sticking surface was prepared according to the method of Example 1, except that 10 parts of Aerosil 200 (fumed silica, tradename of Nippon Silica K.K.) were used in place of 40 parts of polymethylsilsesquioxane (F-1). The thus prepared silicone layer neither slipped off nor showed clouding when it was rubbed with fingers. However, the layer possessed luster and the sliding property was worsened to a small extent.

COMPARATIVE EXAMPLE 3

A composition for treatment was prepared by blending 100 parts of polydimethylsiloxane having a hydroxy group at each terminal unit and having a viscosity of 100,000 cSt at 25° C., 100 parts of polydimethylsiloxane having a γ-glycidoxypropyl group at each terminal unit and having a polymerization degree of 50, 10 parts of γ-aminopropyltriethoxysilane, 20 parts of Aerosil 200 (fumed silica) and 1,000 parts of trichloroethylene. The composition was applied onto a chloroprene rubber sheet, which was then heated at 180° C. for 3 minutes, followed by standing at room temperature for 24 hours to give a chloroprene rubber sheet having non-sticking surfaces. The thus obtained silicone layer was lusterless, and it neither slipped off nor showed clouding when it was rubbed with fingers. However, the layer had dry and rough touch and lacked the sliding property to a great extent.

EXAMPLE 3

A mixture was prepared by blending 100 parts of polydimethylsyloxane having a hydroxy group at each terminal unit and having a viscosity of 500,000 cSt at 25° C. and 75 parts of polymethylsilsesquioxane (F-2), followed by kneading thereof. To 100 parts of the thus obtained mixture were admixed 100 parts of a polyorganosiloxane represented by the average formula:

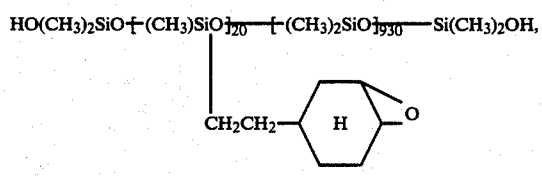

20 parts of γ-(β-aminoethyl)aminopropyltrimethoxysilane, 20 parts of isopropyl alcohol, 80 parts of methyl ethyl ketone and 200 parts of toluene to give a composition for treatment.

The composition was applied onto the surface of an EPDM rubber and, after the solvents were removed by evaporation, it was heated at 150° C. for 5 minutes to give a film, on the surface of the rubber. The film was solid and lusterless, and it has an excellent sliding property. The film was subjected to an abrasion-resistant test and the results are shown in Table 2. The test was performed by pressing a stainless steel bar with a diameter of 5 mm to the rubber so that the bar may sink below the surface thereof by 5 mm and then by moving the bar reciprocally for the distance of 10 cm at a rate of 30 times per minute. The abrasion-resistance was determined by the number of reciprocal movement until cracks appeared on the coated surface.

COMPARATIVE EXAMPLES 4 AND 5

A solid film was obtained on the surface of an EPDM rubber according to method of Example 3, except that 15 parts of Aerosil 200, which had been treated on the surface with dimethyldichlorosilane, were used (Comparative Example 4) in place of 75 parts of polymethylsilsesquioxane (F-2). The thus obtained film was subjected to the abrasion-resistance test in the same manner as in Example 3 and the results are shown in Table 2. As indicated, the film showed a good abrasion-resistance. However, the film was not entirely lusterless and the surface thereof did not have a sliding property. The durability of an untreated EPDM rubber is also shown in Table 2 as Comparative Example 5.

TABLE 2

|  | Example 3 | Comparative Example 4 | Comparative Example 5 |
|---|---|---|---|
| Filler | Polymethylsilsesquioxane (F-2) | Fumed silica treated with chlorosilane | — |
| Luster | Not observed | Remained | — |
| Sliding property | Excellent | Poor (The surface is poor and rough) | — |
| Number of reciprocal movement until cracks appeared (times) | 12,000 | 9,000 | 1,000 |

EXAMPLE 4 AND COMPARATIVE EXAMPLES 6 TO 9

The composition 4 for treatment according to the present invention and comparative compositions 6 to 9 were prepared in a formulation as shown in Table 3. Each composition was applied onto a chloroprene rubber sheet, which was then heated at 180° C. for 3 minutes, to form a non-sticking silicone film on the surface of the sheet. The state of the silicone films when rubbed with fingers are also shown in Table 3.

TABLE 3

|  | Composition 4 | Comparative Composition 6 | Comparative Composition 7 | Comparative Composition 8 | Comparative Composition 9 |
|---|---|---|---|---|---|
| Component (part) | | | | | |
| Polydimethylsilioxane | 100 | 100 | 100 | 100 | 100 |

TABLE 3-continued

|  | Composition 4 | Comparative Composition 6 | Comparative Composition 7 | Comparative Composition 8 | Comparative Composition 9 |
|---|---|---|---|---|---|
| having a hydroxy group each at the both terminals (Viscosity 800,000 cSt) | | | | | |
| Polymethylsilsesquioxane (F-3) | 50 | — | — | — | — |
| Polyorganohydrogensiloxane *1 | 7 | 7 | 7 | 5 | 7 |
| Epoxy-containing polyorganosiloxane *2. | 100 | 100 | 100 | — | — |
| γ-aminopropyltrimethoxysilane | 10 | 10 | 10 | — | 10 |
| Toluene solution of dibutyltin dioctoate (containing 10% by weight in terms of tin) | 20 | 20 | 20 | 20 | 20 |
| Trichloroethylene | 1,000 | 1,000 | 1,000 | 1,000 | 1,000 |
| State when rubbed with fingers | | | | | |
| Slipping-off | Not observed | Not observed | Not observed | Observed | Observed |
| Clouding | Not observed | Not observed | Not observed | Undeterminable due to severe slipping-off | Observed |
| Luster | Not observed | — | Observed | Observed | Observed |
| Sliding property | Good | — | Poor | Undeterminable | Poor |

*1. $(CH_3)_3SiO[(CH_3)_3HSiO]_{20}Si(CH_3)_3$

*2. $CH_2\underset{O}{\overset{}{\diagdown\diagup}}CHCH_2O(CH_2)_3(CH_3)_2SiO[(CH_3)_2SiO]_{48}Si(CH_3)_2(CH_2)_3OCH_2CH\underset{O}{\overset{}{\diagdown\diagup}}CH_2$

EXAMPLES 5 TO 7

Compositions 5 to 7 according to the present invention were prepared in the same manner as Composition 4 in Example 4, except that the catalysts shown in Table 4 were used in place of dibutyltin dioctanoate. The compositions were subjected to curing under the conditions given in Table 4 to form films, which were tested similarly to Example 4. No films caused slipping-off or clouding, when rubbed with fingers.

TABLE 4

| Composition No. | Catalyst Kind | Amount added (part) | Curing Conditions Temperature (°C.) | Time (min) |
|---|---|---|---|---|
| 5 | Dioctyltin dilaurate | 5 | 180 | 5 |
| 6 | Tributyltin acetate | 3 | 170 | 3 |
| 7 | Zinc octoate | 3 | 150 | 3 |

EXAMPLE 8

A homogeneous mixture was prepared by blending 100 parts of polydimethylsiloxane having a hydroxy group at each terminal unit and having a viscosity of 500,000 cSt at 25° C., 6 parts of polymethylhydrogensiloxane composed of units of $(CH_3)_2HSiO_{1/2}$ and units of $SiO_2$ in a molar ratio of 1:0.3, 70 parts of polymethylsilsesquioxane (F-3), 100 parts of a polyorganosiloxane represented by the average formula:

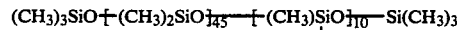

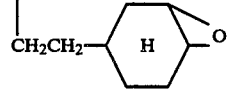

and 30 parts of an amino-containing polysiloxane obtained by the equilibration reaction of γ-aminopropyltriethoxysilane represented by the average formula:

$$H_2N(CH_2)_3Si[\{O(CH_3)_2Si\}_8OC_2H_5]_3$$

and octamethylcyclotetrasiloxane. To the mixture were further added 6 parts of dibutyltin dilaurate, and the whole was blended to give a composition of the invention. The thus obtained composition was applied onto the surface of an ABS resin, which was then heated at 80° C. for 1 minute, to give a non-sticking and lusterless film having a good sliding property. The film had such an excellent adhesive property that it could not easily be peeled off.

EXAMPLE 9

100 parts of a polyorganosiloxane represented by the average formula:

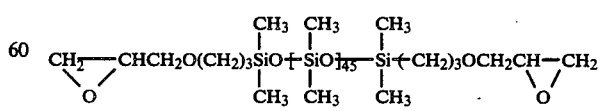

and 6 parts of γ-(methylamino)propyltrimethoxysilane were mixed and heated at 100° C. for 2 hours to give a homogeneous liquid. To this liquid were added 100 parts of a polyorganosiloxane composed of 0.1 mole % methylvinylsiloxy units and 99.9 mole % dimethylsiloxy units and having a viscosity of 2,000,000 cSt at 25° C., 20 parts of polymethylsilsesquioxane (F-4), 4 parts of a polymethylhydrogensiloxane represented by the average formula:

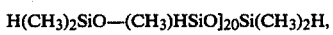
H(CH₃)₂SiO—(CH₃)HSiO]₂₀Si(CH₃)₂H, 1,000 parts of toluene, and 6 parts of stannous octoate, followed by mixing homogeneously to give a composition for treatment.

The composition was applied onto the surface of a SBR, which was then heated at 150° C. for 2 minutes, to give a non-sticking and lusterless film having a good sliding property. The thus obtained film had such an excellent adhesive property that it could not easily be peeled off.

EXAMPLE 10

A mixture was prepared by blending and kneading 100 parts of polyorganosiloxane composed of 25 mole % methyl(3,3,3-trifluoromethyl)siloxy units and 75 mole % dimethylsiloxy units, having a hydroxy group at each terminal unit and having a viscosity of 900,000 cSt at 25° C., and 30 parts of polymethylsilsesquioxane (F-4). To 100 parts of the thus obtained mixture were added 7 parts of [(CH₃)HSiO]₄, 100 parts of a polyorganosiloxane represented by the average formula:

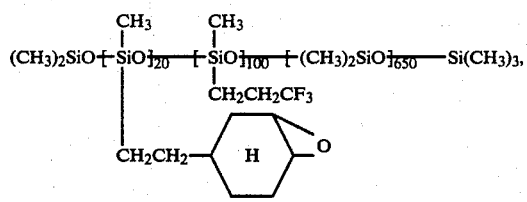

20 parts of γ-(β-aminoethyl)aminopropyltriethoxysilane, 10 parts of dibutyltin diacetate, 20 parts of isopropyl alcohol, 80 parts of methyl ethyl ketone and 200 parts of toluene, to give a composition.

The thus obtained composition was applied onto the surface of an EPDM rubber and then subjected to heat treatment at 150° C. for 5 minutes to remove the solvent therefrom, and to form an abrasion-resistant and lusterless film having an excellent sliding property.

EXAMPLE 11

A composition was prepared by blending 100 parts of the polydimethylsiloxane (F-5), 50 parts of polymethylsilsesquioxane, 5 parts of a polymethylhydrogensiloxane represented by the average formula:

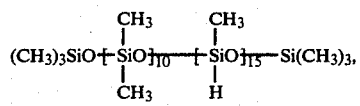

100 parts of a glycidoxy group-containing polyorganosiloxane represented by the average formula

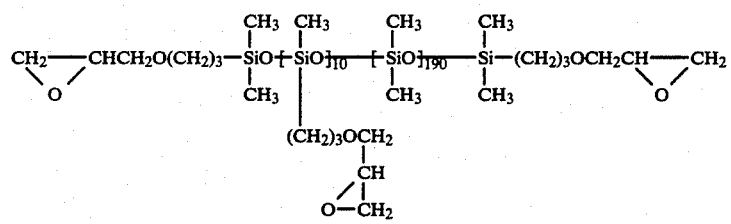

10 parts of γ-aminopropyltriethoxysilane, 1 part of stannous octoate and 1,000 parts of trichloroethylene.

The thus obtained composition was applied onto the surface of an EPDM sponge, which was then heat-treated at 130° C. for 5 minutes, to give an EPDM sponge having a non-sticking surface. The sponge was sandwiched between two glass plates and allowed to stand in an air-conditioned vessel maintained at 45° C. and at 70% humidity, while applying pressure of 50 g/cm² for 60 hours.

At the end of this period, the temperature was returned to room temperature, the application of pressure was removed and the sponge was subjected to the peeling test. On the other hand, the composition prepared above was applied onto the surface of an EPDM plate, which was then heat-treated at 150° C. for 5 minutes, to give a non-sticking surface thereto. A static friction coefficient in the thus obtained EPDM plate and a glass plate was measured.

COMPARATIVE EXAMPLES 10 AND 11

Comparative compositions 10 was prepared according to the method of Example 11, however, they contained no polymethylsilsesquioxane. The compositions were tested in the same manner as in Example 11. The results are shown in Table 5. From the results, it will be apparent that the composition of the present invention is improved in the sliding property when compared with the system containing no polymethylsilsesquioxane. The peeling strength after application of pressure and satic friction coefficient of an untreated EPDM rubber are also shown in Table 5 as Comparative Example 11.

TABLE 5

|  | Example 11 | Comparative Example 10 (containing no polymethyl-silsesquioxane) | Comparative Example 11 (not treated) |
|---|---|---|---|
| Peeling strength after application of pressure (g) | 40 | 95 | 630 |
| Static friction coefficient | 0.12 | 0.45 | 2.1 |

We claim:
1. Polyorganosiloxane compositions for surface treatment comprising:

(A) a polydiorganosiloxane having a viscosity of 50 cSt to 10,000,000 cSt at 25° C., the terminal units of which are blocked by hydroxy groups;

(B) a curing agent which comprises a mixture or a partially reacted mixture of:

(1) a polyorganosiloxane composed of structural units represented by the formula:

$$(R^1)_a SiO_{(4-a)/2}$$

wherein, $R^1$s are the same or different and each represents a hydrogen atom or a substituted or unsubstituted monovalent hydrocarbyl group and at least two $R^1$s out of the total $R^1$'s in a molecule are monovalent hydrocarbyl groups substituted by an epoxy-containing group; and a represents an integer of 1 to 3, and having a polymerization degree of 10 to 5,000;

(2) a silane and/or a siloxane having a substituted or unsubstituted amino group bonded to a silicon atom via at least one carbon atom and also having at least one alkoxy group bonded to a silicon atom;

at a proportion of 0.1 to 10 amino groups contained in (2) per epoxy-containing group contained in (1); and (C) a polymethylsilsesquioxane having a mean particle diameter of 0.1 to 100 μm.

2. The compositions according to claim 1, wherein $R^1$ in polyorganosiloxane (B)(1) is a monovalent hydrocarbyl group substituted by a methyl group and an epoxy-containing group.

3. The compositions according to claim 1, wherein the substituted or unsubstituted amino group in the silane and/or siloxane of (B)(2) is bonded to a silicon atom via at least three carbon atoms.

4. The compositions according to claim 1, wherein polymethylsilsesquioxane (C) is a fine powdery polymethylsilsesquioxane obtained by hydrolysing and condensing methyltrialkoxysilane, or the hydrolysate and condensate in part thereof, in an aqueous ammonia or an amine.

5. The compositions according to claim 1, wherein the mean particle diameter of (C) is 0.1 to 20 μm.

6. Polyorganosiloxane compositions for surface treatment comprising:

(A) a polydiorganosiloxane having a viscosity of 50 cSt to 10,000,000 cSt at 25° C., the terminal units of which are blocked by hydroxy groups;

(B) a curing agent comprising a mixture or a partially reacted mixture of:

(1) a polyorganosiloxane composed of structural units represented by the formula:

$$(R^1)_a SiO_{(4-a)/2}$$

wherein, $R^1$s are the same or different and each represents a hydrogen atom or a substituted or unsubstituted monovalent hydrocarbyl group and at least two $R^1$s out of the total $R^1$'s in a molecule are monovalent hydrocarbyl groups substituted by an epoxy-containing group; and a represents an integer of 1 to 3, and having a polymerization degree of 10 to 5,000;

(2) a silane and/or a siloxane having a substituted or unsubstituted amino group bonded to a silicon atom via at least one carbon atom and also having at least one alkoxy group bonded to a silicon atom;

at a proportion of 0.1 to 10 amino groups contained in (2) per epoxy-containing group contained in (1); and (C) a polymethylsilsesquioxane having a mean particle diameter of 0.1 to 100 μm (D) a polyorganohydrogensiloxane containing at least three hydrogen atoms bonded to silicon atoms; and (E) a curing catalyst effective to promote a dehydrogenating condensation reaction between hydroxy groups and hydride bonds.

7. The compositions according to claim 6, wherein $R^1$ in polyorganosiloxane (B)(1) is a monovalent hydrocarbyl group substituted by a methyl group and an epoxy-containing group.

8. The compositions according to claim 6, wherein the substituted or unsubstituted amino group in the silane and/or siloxane of (B)(2) is bonded to a silicon atom via at least three carbon atoms.

9. The compositions according to claim 6, wherein polymethylsilsesquioxane (C) is a fine powdery polymethylsilsesquioxane obtained by hydrolysing and condensing methyltrialkoxysilane, or the hydrolysate and condensate in part thereof, in an aqueous ammonia or an amine.

10. The compositions according to claim 6, wherein the mean particle diameter of (C) is 1 to 20 μm.

* * * * *